United States Patent [19]
Sivaram et al.

[11] Patent Number: 5,965,477
[45] Date of Patent: Oct. 12, 1999

[54] PROCESS FOR THE PREPARATION OF SUPPORTED METALLOCENE CATALYST

[75] Inventors: Swaminathan Sivaram, Pune; Soumen Sensarma, West Bengal, both of India

[73] Assignee: Council of Scientific & Industrial Research, New Delhi, India

[21] Appl. No.: 08/856,196

[22] Filed: May 14, 1997

[30] Foreign Application Priority Data

Feb. 21, 1997 [IN] India ......................................... 437/97

[51] Int. Cl.$^6$ .............................. B01J 31/00; B01J 37/00; C08F 4/02; C08F 4/60
[52] U.S. Cl. ......................... 502/107; 502/115; 502/121; 502/122; 502/123; 502/124; 502/125; 502/126; 502/127; 502/134
[58] Field of Search ..................................... 502/104, 107, 502/121, 122, 123, 124, 125, 126, 127, 115, 134

[56] References Cited

U.S. PATENT DOCUMENTS

| | | | |
|---|---|---|---|
| 4,659,685 | 4/1987 | Coleman, III et al. | 502/113 |
| 4,990,479 | 2/1991 | Ishimaru et al. | 502/127 |
| 5,032,562 | 7/1991 | Lo et al. | 502/125 |
| 5,057,475 | 10/1991 | Canich et al. | 502/125 |
| 5,397,757 | 3/1995 | Mink et al. | 502/104 |

FOREIGN PATENT DOCUMENTS

| | | |
|---|---|---|
| 0 170 059 | 2/1986 | European Pat. Off. . |
| 0 206 794 | 12/1986 | European Pat. Off. . |
| 0 285 443 | 10/1988 | European Pat. Off. . |
| 0 295 312 | 12/1988 | European Pat. Off. . |
| 0 435 514 | 7/1991 | European Pat. Off. . |
| 0 436 326 | 7/1991 | European Pat. Off. . |
| 0 576 213 | 12/1993 | European Pat. Off. . |
| 0 608 054 | 7/1994 | European Pat. Off. . |
| 0 613 908 | 9/1994 | European Pat. Off. . |
| 0 619 325 | 10/1994 | European Pat. Off. . |
| 0 619 326 | 10/1994 | European Pat. Off. . |
| 3-66710 | 3/1991 | Japan . |
| 4-96908 | 3/1992 | Japan . |
| 5-170822 | 7/1993 | Japan . |
| 5-186524 | 7/1993 | Japan . |
| 6-184226 | 7/1994 | Japan . |
| 7-53624 | 2/1995 | Japan . |
| WO 93/09148 | 5/1993 | WIPO . |

*Primary Examiner*—Mark L. Bell
*Assistant Examiner*—J. Pasterczyk
*Attorney, Agent, or Firm*—Birch, Stewart, Kolasch & Birch, LLP

[57] ABSTRACT

This invention is directed to a process for the preparation of a supported metallocene catalyst, said process comprising preparing a precursor catalyst material by dissolving a magnesium halide in an electron donor solvent in which the magnesium halide is completely soluble, heating the solution to a temperature in the range of 20° C. to the boiling point of the respective electron donor for a period ranging between 10 to 60 minutes, separately preparing a solution of the metallocene compound into the same electron donor solvent, heating the solution to a temperature in the range of 25° C. to 70° C. for a period ranging between 0.1 to 0.5 hrs., mixing the two solutions to obtain a homogenous solution of catalyst precursor compound, stirring and maintaining this resulting homogenous solution at a temperature in the range of 50° C. to 70° C. for a period of 0.5 to 2 hrs., separately preparing a slurry of support in a liquid hydrocarbon medium, heating the slurry to a temperature in the range of 50° C. to 70° C. and stirring it for a period of 0.25 to 2 hrs., mixing the homogenous solution of the catalyst precursor compound with the slurry of the support, stirring the resulting slurry for 0.5 to 3 hrs. maintaining at a temperature ranging between 50° C to 70° C., cooling the resultant slurry to room temperature under an inert atmosphere, separating the solid by conventional methods, washing the solid with a hydrocarbon solvent and drying the solid under vacuum to obtain the product.

19 Claims, No Drawings

PROCESS FOR THE PREPARATION OF SUPPORTED METALLOCENE CATALYST

FIELD OF THE INVENTION

This invention relates to a process for the preparation of a supported metallocene catalyst. More particularly it relates to a process for the preparation of the said catalyst which is supported with silica-magnesium halide. The catalyst prepared by the process of the present invention is capable of olefin polymerization and copolymerization, giving olefin polymers and copolymers with high catalyst activity at high temperatures.

BACKGROUND OF INVENTION

Anhydrous magnesium chloride, commonly used as a support in high activity olefin polymerization catalyst is, often not, convenient because it is very brittle and undergoes easy attrition in the polymerization reactor. Silica is a well known support for fluidized bed gas phase polymerization of olefins using titanium based Ziegler-Natta catalysts. However, when used with metallocene type catalysts silica supports show low polymerization activities. Therefore, a combination of the two, namely, silica and anhydrous magnesium chloride, offers a good balance of properties to prepare catalysts with high activity, controlled particle size and good resistance to attrition.

Olefin polymerization and copolymerization catalysts comprising a metallocene and an aluminum alkyl component are well known in the prior art. The molecular weight of the polymer can be controlled by adjusting the reaction temperature or the amount of co-catalyst or by the addition of hydrogen. The metallocene catalysts require the use of methylaluminoxane (herein after referred to as MAO) as co-catalyst, which is produced by reacting an aluminum alkyl with water.

DESCRIPTION OF RELATED ART

The principle disadvantages of the soluble homogeneous metallocene-methylaluminoxane catalyst systems of the prior art are the need for a large molar excess of MAO, (Al/Metal>105) for obtaining acceptable polymerization activities and poor control on polymer powder morphologies. Furthermore, when used in gas or slurry phase processes there is a tendency for reactor fouling by forming deposits on the surface of the walls of the reactor and stirrer. These deposits result in the agglomeration of the polymer particles when the metallocene and aluminoxanes or both exists in the suspension medium. Such deposits in the reactor system must be removed regularly. Otherwise, they prevent adequate heat removal from the reaction, thus adversely affecting the product quality.

The above disadvantages can be obviated by the use of heterogeneous catalysts. Heterogeneous metallocene based catalysts are generally prepared using either a porous inorganic oxide carrier such as silica, alumina, magnesium oxide and silica/alumina or a group HIA alkaline earth metal halides, preferably, anhydrous magnesium chloride. Attempts have been made to support the catalyst components either on a refractory oxide or by mixing, methylaluminoxane and metallocene with inorganic supports (Eur. Pat. Appl. No. 206,794). Eur. Pat. Nos. EP 285, 443 EP 295, 312 describe a polymerization system in which, an inorganic oxide and an organic polymer are employed as support for metallocenes. The cocatalyst, MAO, by the use of solvent in which it is poorly soluble, is precipitated on the support. JP 06, 184, 226 describes a silica supported metallocene catalyst, which, in conjunction with MAO is useful for the polymerization of ethylene with moderate activity. Eur. Pat. No. EP 619, 325 describes a silica supported metallocene catalyst which lead to the production of bimodal polyethylene. Eur. Pat. No EP 619, 326 discloses another silica supported metallocene catalyst which can be used for gas-phase polymerization of ethylene in combination with N,N-dimethylanilinium (tetrakispentafluorophenyl)borate and triisobutylaluminum as cocatalyst.

As an alternative, a catalyst has been prepared by reacting water containing silica with trimethylaluminum and to use the resultant suspension as a support for metallocenes (Eur. Pat. No. 323, 716) or to carry out the entire reaction of trimethylaluminum, water containing silica and metallocene in the polymerization reactor (Eur. Pat. No. 170, 059). These processes lead to the formation of MAO dissolved in the reaction medium which eliminates the advantages of the support. Furthermore, these supported methylaluminoxane have significantly lower polymerization activity.

A number of patents describe silica supported zirconium based metallocene catalyst systems (U.S. Pat. No 5,057,475; WO 93/09148; JP 05, 170, 822; JP 06, 184, 226; JP 07, 53, 624). Eur. Pat. No. 608, 054 and WO 94/21691 describe highly active silica supported metallocene catalysts which in combination with MAO or trialkylaluminum compounds can be used for homo or co-polymerization of olefins.

Eur. Pat. No. 435, 514 and 436, 326 discloses supported zirconium based metallocene catalysts prepared by reaction of dibutylmagnesium and tertiary butyl chloride in the presence of an electron donor such as diisoamyl ether. These catalysts are useful for the gas-phase polymerization of ethylene. JP 03, 66, 710 and JP 05, 186, 524 describe a magnesium chloride supported metallocene catalysts which are useful for propylene polymerization.

However, both silica and magnesium chloride when individually used as supports have certain drawbacks. Magnesium chloride is when brittle in nature. It has a tendency to undergo attrition during its use as the catalyst is subjected to high exothermicity. These catalysts, therefore, cannot be employed at high temperatures. On the other hand, silica, when used as a support with metallocene type catalysts show low polymerization activities and, often, causes a broadening of molecular weight distribution. Therefore, it may be advantageous to use a combination of both silica and magnesium chloride, to give the catalyst, the specific advantage of each of the supports.

U.S. Pat. No. 5,032,562, describes the preparation of a solid supported catalyst, by the reaction of dibutyl magnesium, a zirconium based neutral metallocene and a compound of a transition metal halide such as titanium tetrachloride and impregnating the said precursor onto silica in the presence of an aluminoxane activator. However, this catalyst results in bimodal distribution of molecular weights, which is not desirable in most of the applications where polyethylene is used.

JP 04, 96, 908, describes another supported solid catalyst prepared by reacting aqueous magnesium halides in presence of silica, metallocene and an organoaluminum activator, which shows only moderate activity towards ethylene polymerization at 80° C.

Eur. Pat. No. EP 613, 908, describes a silica-magnesium chloride supported metallocene catalyst which in the presence of an organoboron compound polymerizes ethylene in a high yield. However, the catalyst prepared according to this method is not very stable to storage and handling.

SUMMARY OF THE INVENTION

Therefore, the present invention provides an olefin polymerization and copolymerization catalyst capable of producing high catalyst activity, narrow molecular weight distributions, especially at high temperatures and capable of being used either in gas or slurry phase processes, and in addition, to provide a catalyst by the deposition of a homogeneous solution of anhydrous magnesium chloride and a zirconium based metallocene on to a carrier like high surface area silica, affording a superior impregnation of magnesium-zirconium catalyst precursor on the support.

DETAILED DESCRIPTION OF THE INVENTION

The solid catalyst for olefin polymerization and copolymerization according to the present invention is characterized in that the said catalyst comprises of:

a) a particulate carrier composed of an oxide of at least one selected from among those belonging to the groups II, III, IV of the Periodic Table having a surface area of about 300 m$^2$/g and containing at least 3 mmol of hydroxyl group per gram of the oxide;

b) a transition metal compound of a metal belonging to the group IVB of the Periodic Table containing a ligand having a cyclopentadienyl skeleton;

c) a particulate compound magnesium halide has the structure MgX$^2$ where X is selected from the group containing Cl, Br, or I;

wherein the magnesium halide and the transition metal compound are supported on the particulate carrier.

An object of the present invention is to provide a process for the preparation of supported metallocene catalyst designed to rectify the drawbacks in the prior art catalyst by furnishing a new solid supported catalytic system, whose preparation can be performed easily.

Another object of the present invention is to provide a process for the preparation of a solid catalyst capable of being employed for the polymerization of the olefins especially ethylene, said catalyst comprising atoms of Mg, Cl an electron donor compound such as tetrahydrofuran, a neutral metallocene and a solid support based on a refractory oxide.

Accordingly, the present invention provides a process for the preparation of supported metallocene catalyst which comprises, preparing a precursor catalyst material which consists of preparing the solution of magnesium halide compound in an electron donor solvent in which the magnesium halide will be completely soluble, heating the solution to a temperature in the range of 65° C. to the boiling point of the respective electron donor for a period ranging between 10 to 60 minutes, separately preparing the solution of the metallocene compound into the same electron donor solvent, heating the solution to a temperature in the range of 25° C. to 70° C. for a period ranging between 0.1 to 0.5 hrs., mixing the two solutions to obtain the homogenous solution of catalyst precursor compound, stirring and maintaining this resulting homogenous solution at a temperature in the range of 50° C. to 70° C. for a period of 0.5 to 2 hrs., separately preparing the slurry of the support in the liquid hydrocarbon medium, heating the slurry to a temperature in the range of 50° C. to 75° C. and stirring it for a period of 0.25 to 2 hrs., mixing the homogenous solution of the catalyst precursor compound with the slurry of the support, stirring the slurry for 0.5 to 3 hrs maintaining at a temperature ranging between 50° C. to 70° C.. cooling the resultant slurry to room temperature under inert atnosphere, separating the solid by conventional methods, washing the solid by hydrocarbon solvent, drying the solid under vacuum to obtain the product.

The electron donor solvent used for the preparation of the solution of the magnesium halide may be alkyl esters of aliphatic and aromatic carboxylic acids, aliphatic ethers, cyclic ethers and aliphatic ketones. Alkyl esters of C$^1$ to C$^4$ saturated aliphatic carboxylic acids; alkyl esters of C$^7$ to C$^8$ aromatic carboxylic acids; C$^2$ to C$^6$, C$^3$ to C$^4$ aliphatic ethers; C$^3$ to C$^4$ cyclic ethers are preferred, C$^4$ mono or di ether most preferred being methyl formate, ethyl acetate, butyl acetate, hexyl ether, tetrahydrofuran and dioxane.

The magnesium halide used may be such as magnesium chloride, magnesium bromide and magnesium iodide, preferably magnesium chloride.

The metallocene compound used has a general formula
(Y)$_a$(Y')$_b$Mx$_x$ 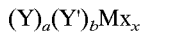

Y and Y' each designate an unsaturated hydrocarbon radical with a central atom M. The groups Y and Y' can be obtained by a covalent bridge (bond)

M indicates the transition metal which are chosen from the groups IIIB, IVB, VB and VIB of the Periodic Table.

a, b and x designate the integral numbers such as a+b+x=m, x>0, and a and/or b not equal to zero.

m indicates the valence of the transition metal M

X designates a halogen selected from Cl, Br and I.

The transitional element in the metallocene compound may be such as scandium, titanium, zirconium, hafiium and vanadium, preferably zirconium.

The Y and Y' groups in the metallocene compound are mono or a polycyclic group having a cyclopentadlenyl skeleton substituted with 5 to 50 carbon atoms bond with a double conjugated bond such as cyclopentadienyl (Cp), indenyl, or a fluorenyl radical or a derivative substituted by this radical containing up to 10 atoms of carbon, or a radical derived from the elements chosen from the group VA of the Periodic Table, such as N or P.

Refractory oxide support contains hydroxyl finctional groups and may have a specific surface area (BET) of 50 to 1000 m$^2$/g, especially, from 100 to 400 m$^2$/g and a pore vol. of 0.5 to 5 ml/g preferably, from 1 to 3 ml/g.

In yet another embodiment of the present invention, the support may be selected from inert porous materials such as dry powders of oxides of silicon or aluminum having an average particle size of about 10 to 250 microns, preferably 50 to 150 microns and a surface area of 50 to 600 m$^2$/g, preferably 100 to 300 m$^2$/g.

In one more embodiment of the present invention, the ratio of magnesium halide per mole of the metallocene compound is 0.5 to 50 preferably 1 to 8.

In a particular embodiment, the (Cp)$_a$(Cp')$_b$MX$_x$ may be selected from Cp$_2$ZrCl$_2$ and bisindenyl zirconium dichloride. The amount of magnesium halide to the carrier may be in the range of 0.5 to 50 wt %.

In a feature of the present invention, the inert support materials should be dry, i.e. free of absorbed water. Drying of the carrier materials can be effected by heating at a temperature of about 150° C. or more or by treating these materials by means of aluminum alkyls compounds or aluminoxanes compounds. The higher the cacining temperature, the lower is the amount of hydroxyl group on the support. Temperatures of about 150 to 900° C. can be used, with the preferred range between 400 to 600° C. Modification of the support in this manner provides the catalyst composition with increased activity.

The quantity of hydroxyl groups in the support depends on the support employed, as its specific area, on the physicochemical treatment and on drying to which it may have been subjected beforehand. A support which is ready for use generally contains from 0.1 to 5 preferably, from 0.5 to 3 mmol of hydroxyl groups per gram.

In a feature of the present invention, the support which may be granular, is preferably devoid of free water at the time of its use in the catalyst preparation. For this purpose, it can be preferably made free of water by means which are well known, such as heat treatment ranging from 100 to 950° C. specially, 150 to 700° C. or by treating the oxide material with aluminum alkyl or aluminoxane compounds. The support may be chosen, in particular, from a silica, alumina, silica-alumina or a mixture of these oxides, and may consist of particles which have a mass mean diameter ranging from 30 to 240 microns especially, from 50 to 150 microns. The use of silica is preferred, specially ones sold by Davison Chemical under the commercial reference Davison 952.

In another feature of the present invention, the essential characteristics of a solid catalyst precursor is the halide state of neutral metallocene containing at least one cyclopentadienyl ligand in the backbone moiety making a part of the precursor.

Neutral metallocene with formula $((Cp)_a(Cp)'_b MX_x)$ may be cited as an example, in which X is selected from Cl, Br or and I. The mono and dihalide scandium metallocenes such as chlorodi(cyclopentadienyl)scandium, and dichloro (indenyl)scandium, mono, di and trihalides titanium metallocenes, such as chloro-tri(pentamethyl cyclopentadienyl)titanium, tichloro(cyclo-pentadienyl)titanium, mono, di or trihalides of zirconim such as trichloro (cyclopentadienyl)zirconium, dichloro(biscyclopentadienyl)zirconium metallocene. Among which, the last one is the most preferred.

Yet another feature of the present invention is that the electron donor compound should be a liquid organic compound at 25° C. and in which the metallocene and the magnesium compound are partially or completely soluble.

In yet another feature of the present invention the precursor is formed by dissolving at least one metallocene compound and at least one magnesium compound in at least one electron donor compound at a temperature of from about 20° C. up to the boiling point of the electron donor compound. The metallocene compound can be added to the electron donor compound before or after addition of the magnesium compound. The dissolution of the magnesium and the metallocene compound can be facilitated by stilring, or by refluxing the two compounds in the electron donor compound. The solution of these two components is impregnated into the porous inert carrier material in a weight ratio of about 0.033:1 to 1:1 and preferably from 0.15:1 to 0.33:1 parts of Mg/Zr/electron donor composites per part by weight of carrier material.

In yet another feature of the present invention the impregnation of the dried support may be accompanied by addition of an aliphatic hydrocarbon solvent to the inert carrier material at a temperature of about 25° C. to near boiling point of the solvent and then admixing the previous magnesium and metallocene compound dissolved in electron donor to the porous carrier material to impregnate the support. The catalyst may be washed several times with an aliphatic hydrocarbon. The excess aliphatic hydrocarbon is then removed by drying under vacuum until a constant weight is obtained. Drying can be done at a temperature from about 40° C. to 80° C., especially, at 25° C. to 35 C.

In yet another feature of the present invention, the catalyst precursor made according to the present invention has the formula $$MgX_aM_b(ED)C_cCp_d$$

wherein,

X is selected from the group consisting of Cl, Br, and I and may be mixtures thereof.

M indicates the transition metal which are chosen from the groups IIB, IVB, VB, VIB of the Period Table.

ED is an electron donor compound, a is 1 to 50, preferably, 1.5 to 2.5 b is 0.01 to 1 preferably, 0.02 to 0.05 c is 2 to 80, preferably, 1.5 to 2.5 d is 0.03 to 1, preferably, 0.05 to 0.09

Ms refers to the element magnesium, and the amount of magnesium chloride on the carrier material is in the range preferably from 0.5 to 50, especially, from 1 to 5 weight percent.

These catalysts are useful for the polymerization and copolymerization of olefms as described in the co-pending Indian patent application No. 421/OEL/1997 which corresponds to U.S. Ser. No. 08/856,315.

The process of the present invention is described hereinbelow with examples which are illustrative only and should not be construed to limit the scope of the present invention in any manner.

EXAMPLE-1

This example illustrates the preparation of the catalyst precursor:

All glass equipment were heated under vacuum and flushed with nitrogen. All manipulations involving air-sensitive compounds were performed inside a Labconco Model 50004 inert atmosphere glove box continuously purged with high purity $N_2$ from a generator (Spantech Model NG 300-1) or under a positive pressure of high purity $N_2$ using standard bench top inert atmosphere techniques. The solvent n-hexane and electron donor used in each case was freshly distilled over sodium under $N_2$. Magnesium was estimated titrimetrically using EDTA. Chlorine was estimated by argentometric method. The amount of zirconium in the catalyst was determined by using Inductively Coupled Plasma ionization spectrometer.

EXAMPLE-2

A support, namely, "Davison 952" silica powder sold by Davison Chemical Company which had a specific surface area of 300 m²/g and a pore volume 1.65 cc/g, hydroxyl groups, 2.8 mmol/g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCl_2$, 394.3 mg was placed followed by addition of 70 ml of tetrahydrofuran. The resulting mixture was then heated at 60–65° C. or ½ h until all magnesium chloride dissolved in tetrahydrofiuan. Bis(cyclopentadienyl) zirconium (IV)dichloride, (335 mg) was dissolved in 20 ml of tetrahydrofuran and the solution was added to the solution of magnesium chloride over a period of 15 minutes. The resulting homogeneous solution was stirred for ½ h at 60–65° C.

In another three neck flask which was flame dried and cooled under $N_2$, 4.22 g of calcined silica was placed followed by 300 ml of n-hexane. The slurry was stirred for ½ h at 60–65° C.

The homogeneous solution of magnesium chloride and zirconium metallocene in tetrahydrofuran prepared as above was added to the slurry of silica solution over a period of ½ h. The whole slurry was stirred for 1 h at 60–65° C.

The slurry was cooled to room temperature under $N_2$, filtered and washed three times each with 50 ml of n-hexane. The solid was dried under vacuum. The amount of Zr, Cl, Mg and THF (wt %) in the resultant catalyst solid was 0.36, 10, 2.4 and 15.7 respectively.

EXAMPLE-3

A support, namely, "Davison 952" silica powder sold by Davison Chemical Company which had a specific surface area of 300 $m^2/g$ and a pore volume 1.65 cc/g, hydroxyl groups, 2.8 mmol/g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCl_2$, 209.5 mg was placed followed by addition of 40 ml of tetrahydrofuran. The resulting mixture was then heated at 60–65° C. for ½ h until all magnesium chloride dissolved in tetrahydrofuran. Bis(cyclopentadienyl) zirconium (IV)dichloride, (251 mg) was dissolved in 10 ml of tetrahydrofuran and the solution was added to the solution of magnesium chloride over a period of 25 minutes. The resulting homogeneous solution was stirred for ½ h at 60–65° C.

In another three neck flask which was flame dried and cooled under $N_2$, 2.54 g of calcined silica was placed followed by 200 ml of n-hexane. The slurry was stirred for ½ h at 60–65 C.

The homogeneous solution of magnesium chloride and zirconium metallocene in tetrahydrofuran prepared as above was added to the slurry of silica solution over a period of ½ h. The whole slurry was stirred for 1 h at 60–65° C.

The slurry was cooled to room temperature under $N_2$, filtered and washed three times each with 30 ml of n-hexane. The solid was dried under vacuum. The amount of Zr, Cl, Mg and THF (wt %) in the resultant catalyst solid was 0.45, 10.7, 2.0 and 17 respectively.

EXAMPLE-4

A support, namely, "Davison 952" silica powder sold by Davison Chemical Company which had a specific surface area of 300 $m^2/g$ and a pore volume 1.65 cc/g, hydroxyl groups, 2.8 mmol/g of silica was employed. It was dried at 550° C. for 14 hours to obtain a silica powder free of water and containing 1 mmol hydroxyl groups per gram of silica.

In a three neck round boffom flask equipped with magnetic needle, reflux condenser, $N_2$ inlet and outlet which was flame dried under vacuum and cooled under nitrogen. Anhydrous $MgCl_2$, 180.3 mg was placed followed by addition of 40 ml of tetrahydrofuran. The resulting mixture was then heated at 70–75° C. for ½ h until all magnesium chloride dissolved in tetrahydroflnan. Bis(cyclopentadienyl) zirconium (IV)dichloride, (255 mg) was dissolved in 10 ml of tetrahydrofuran and the solution was added to the solution of magnesium chloride over a period of 20 minutes. The resulting homogeneous solution was stirred for ½ h at 70–75° C.

In another three neck flask which was flame dried and cooled under $N_2$, 2.50 g of calcined silica was placed followed by 200 ml of n-hexane. The slurry was stirred for ½ h at 70–75° C.

The homogeneous solution of magnesium chloride and zirconium metallocene in tetrahydrofuran prepared as above was added to the slurry of silica solution over a period of ½ h. The whole slurry was stirred for 1 h at 70–75° C.

The slurry was cooled to room temperature under $N_2$, filtered and washed three times each with 30 ml of n-hexane. The solid was dried under vacuum. The amount of Zr, Cl, Mg and THF (wt %) in the resultant catalyst solid was 0.48, 9.70, 1.8 and 15.0 respectively.

EXAMPLE-5

A support, namely, "Davison 952" silica powder sold by Davison Chemical Company which had a specific surface area of 300 $m^2/g$ and a pore volume 1.65 cc/g, hydroxyl groups, 2.8 mmol/g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCl_2$, 200 mg was placed followed by addition of 50 ml of tetrahydrofuran. The resulting mixture was then heated at 60–65° C. for ½ h until all magnesium chloride dissolved in tetrahydrofuran. Bis(cyclopentadienyl) zirconium (IV) dichloride, (250 mg) was dissolved in 15 ml of tetrahydrofuran and the solution was added to the solution of magnesium chloride over a period of 15 minutes. The resulting homogeneous solution was stirred for ½ h at 60–65° C.

In another three neck flask which was flame dried and cooled under $N_2$, 2.60 g of calcined silica was placed followed by 300 ml of n-hexane. The slurry was stirred for ½ h at 60–65° C.

The homogeneous solution of magnesium chloride and zirconium metallocene in tetrahydrofuran prepared as above was added to the slury of silica solution over a period of ½ h. The whole slurry was stirred for 2 h at 60–65° C.

The slurry was cooled to room temperature under $N_2$, filtered and washed three times each with 50 ml of n-hexane. The solid was dried under vacuum. The amount of Zr, Cl, Mg and THF (wt %) in the resultant catalyst solid was 0.40, 10, 2.2 and 17 respectively.

EXAMPLE-6

A support, namely, "Davison 952" silica powder sold by Davison Chemical Company which had a specific surface area of 300 $m^2/g$ and a pore volume 1.65 cc/g, hydroxyl groups, 2.8 mmol/g of silica was employed. It was dried at 550° C. for 14 hours to obtain a silica powder free of water and contaning 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCl_2$, 277.6 mg was placed followed by addition of 40 ml of tetrahydrofuran. The resulting mixture was then heated at 60–65° C. for ½ h until all magnesium chloride dissolved in tetrahydrofuran. Bis(cyclopentadienyl ) titanium (IV) dichloride, (503 mg) was dissolved in 20 ml of tetrahydrofuran and the solution was added to the solution of magnesium chloride over a period of 15 minutes. The resulting homogeneous solution was stirred for ½ h at 60–65° C.

In another three neck flask which was flame dried and cooled under $N_2$, 2.90 g of calcined silica was placed followed by 300 ml of n-hexane. The slurry was stirred for ½ h at 60–65° C.

The homogeneous solution of magnesium chloride and zirconium metallocene in tetrahydrofuran prepared as above was added to the slurry of silica solution over a period of ½ h. The whole slurry was stirred for 1 h at 60–65° C.

The slurry was cooled to room temperature under $N_2$, filtered and washed three times each with 50 ml of n-hexane. The solid was dried under vacuum. The amount of Ti, Cl, Mg and THF (wt %) in the resultant catalyst solid was 2.64, 11.2, 2.3 and 14.2 respectively.

EXAMPLE-7

A support, namely, "Davison 952" silica powder sold by Davison Chemical Company which had a specific surface area of 300 m²/g and a pore volume 1.65 cc/g, hydroxyl groups, 2.8 mmol/g of silica was employed. It was dried at 550° C. for 14 hours to obtain a silica powder free of water and containing 1 mmol hydroxyl groups per gram of silica.

In a three neck round bottom flask equipped with magnetic needle, reflux condenser, $N_2$ inlet and outlet which was flame dried under vacuum and cooled under nitrogen. Anhydrous $MgCL_2$, 210 mg was placed followed by addition of 70 ml of tetrahydrofuran. The resulting mixture was then heated at 60–65° C. for ½ h until all magnesium chloride dissolved in tetrahydrofuran. Bis(indenyl) zirconium (IV) dichloride, (300 mg) was dissolved in 20 ml of tetrahydrofuran and the solution was added to the solution of magnesium chloride over a period of 15 minutes. The resulting homogeneous solution was stirred for ½ h at 60–65° C.

In another three neck flask which was flame dried and cooled under $N_2$, 2.4 g of calcined silica was placed followed by 300 ml of n-hexane. The slurry was stirred for ½ h at 60–65° C.

The homogeneous solution of magnesium chloride and zirconium metallocene in tetrahydrofuran prepared as above was added to the slurry of silica solution over a period of ½ h. The whole slurry was stirred for 2 h at 60–65° C.

The slurry was cooled to room temperature under $N_2$, filtered and washed three times each with 30 ml of n-hexane. The solid was dried under vacuum. The amount of Zr, Cl, Mg and THF (wt %) in the resultant catalyst solid was 0.30, 9.50, 2.4 and 16 respectively.

We claim:

1. A process for the preparation of a supported metallocene catalyst, which comprises preparing a precursor catalyst material, by preparing a solution (A) of a magnesium halide in an electron donor solvent in which the magnesium halide is completely soluble; heating the solution (A) to a temperature in the range of 20° C. to the boiling point of the electron donor solvent for a period ranging between 10 to 60 minutes; separately preparing a solution (B) of a metallocene compound in the same electron donor solvent, heating the solution (B) to a temperature in the range of 25° C. to 70° C. for a period ranging between 0.1 to 0.5 hrs., mixing the two solutions (A) and (B) to obtain a homogenous solution of catalyst precursor compound; stirring and maintaining a resulting homogenous solution at a temperature in the range of 50° C. to 70° C. for a period of 0.5 to 2 hrs.; separately preparing a slurry of a support in a liquid hydrocarbon medium; heating the slurry to a temperature in the range of 50° C. to 75° C. and stirring for a period of 0.25 to 2 hrs.; mixing the homogenous solution of the catalyst precursor compound with the resulting slurry of the support to produce a product slurry, stirring the product slurry for 0.5 to 3 hrs at a temperature ranging between 50° C. to 70° C.; cooling the product slurry to room temperature under an inert atmosphere; separating the resulting solid supported metallocene catalyst from the solvents of the product slurry, washing the solid supported metallocene catalyst with a hydrocarbon solvent, and drying the catalyst under vacuum;

wherein the metallocene has a transition metal selected from the group consisting of groups IIIB, IVB, VB, and VIB of the Periodic Table.

2. The process as claimed in claim 1, wherein the electron donor solvent is selected from the group consisting of an alkyl ester of an aliphatic or an aromatic carboxylic acid, an aliphatic ether, a cyclic ether and an aliphatic ketone.

3. The process as claimed in claim 1, wherein the magnesium halide is selected from the group consisting of magnesium chloride, magnesium bromide and magnesium iodide.

4. The process as claimed in claim 1, wherein the metallocene compound used has a general formula

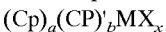

where Cp and Cp' each represent an unsaturated hydrocarbon radical having a cyclopentadienyl skeleton;

M indicates a transition metal selected from the groups IIIB, IVB, VB and VIB of the Periodic Table;

a, b and x designate integral numbers such that a+b+x=m, x>0, and a+b are not equal to zero;

m indicates the valence of the transition metal M; and

X designates a halogen selected from the group consisting of Cl, Br and I.

5. The process as claimed in claim 1, wherein the transition metal in the metallocene compound is selected from the group consisting of scandium, titanium, zirconium, hafnium and vanadium.

6. The process as claimed in claim 4, wherein the Cp and Cp' groups in the metallocene compound are a mono or a polycyclic group having a cyclopentadienyl skeleton which may be substituted with 5 to 50 carbon atoms and is bound to M and is optionally substituted with a radical containing an element selected from group VA of the Periodic Table.

7. The process as claimed in claim 1, wherein the support is selected from inert porous materials having an average particle size of about 10 to 250 microns.

8. The process as claimed in claim 1, wherein the ratio of magnesium halide per mole of the metallocene compound is 0.5 to 50.

9. The process as claimed in claim 4, wherein said metallocene compound is selected from the group consisting of $Cp_2ZrCl_2$, $Cp_2TiCl_2$, and bisindenyl zirconium dichloride.

10. The process as claimed in claim 1, wherein the amount of magnesium halide with respect to the support is in the range of 0.5 to 50 weight percent.

11. The process as claimed in claim 2, wherein said alkyl ester is an alkyl ester of a $C_1$ to $C_4$ saturated aliphatic carboxylic acid or an alkyl ester of a $C_7$ to $C_8$ aromatic carboxylic acid.

12. The process as claimed in claim 2, wherein said aliphatic ether is a $C_2$ to $C_6$ aliphatic ether.

13. The process as claimed in claim 2, wherein said cyclic ether is a $C_3$ to $C_4$ cyclic ether.

14. The process as claimed in claim 1, wherein said electron donor solvent is selected from the group consisting of methyl formate, ethyl acetate, butyl acetate, hexyl ether and tetrahydrofuran.

15. The process as claimed in claim 3, wherein said magnesium halide is magnesium chloride.

16. The process as claimed in claim 4, wherein Cp and Cp' are cyclopentadienyl.

17. The process as claimed in claim 5, wherein said transitional metal is zirconium.

18. The process according to claim 6, wherein Cp and Cp' are selected from the group consisting of pentamethylcyclopentadienyl, cyclo-pentadienyl, indenyl and fluorenyl radicals.

19. The process as claimed in claim 7, wherein said inert porous material is a dry powder oxide of silicon or aluminum.

* * * * *